United States Patent
Sexton et al.

(10) Patent No.: US 8,233,801 B2
(45) Date of Patent: Jul. 31, 2012

(54) WIRELESS HIGH CAPACITY SUB-SEA COMMUNICATIONS SYSTEM

(75) Inventors: Daniel Sexton, Niskayuna, NY (US); John Erik Hershey, Ballston Lake, NY (US); John Carbone, Ballston Spa, NY (US); Lynn Ann Derose, Gloversville, NY (US); John Anderson Ross, Niskayuna, NY (US); Todd Tolliver, Clifton Park, NY (US); Michael Dell'Ano, Clifton Park, NY (US)

(73) Assignee: Vetco Gray Inc., Houston, TX (US)

( * ) Notice: Subject to any disclaimer, the term of this patent is extended or adjusted under 35 U.S.C. 154(b) by 989 days.

(21) Appl. No.: 12/193,284

(22) Filed: Aug. 18, 2008

(65) Prior Publication Data

US 2010/0040375 A1    Feb. 18, 2010

(51) Int. Cl.
*H04B 10/00* (2006.01)
(52) U.S. Cl. ........ 398/104; 398/140; 398/153; 398/164; 398/165; 367/131; 367/133; 367/141; 367/142; 181/110; 181/118
(58) Field of Classification Search ........... 398/135–139
See application file for complete search history.

(56) References Cited

U.S. PATENT DOCUMENTS

| | | | |
|---|---|---|---|
| 5,157,676 A * | 10/1992 | Wilcox | 372/29.021 |
| 5,303,207 A | 4/1994 | Brady et al. | |
| 5,579,285 A * | 11/1996 | Hubert | 367/133 |
| 5,687,137 A * | 11/1997 | Schmidt et al. | 367/131 |
| 5,894,450 A * | 4/1999 | Schmidt et al. | 367/134 |
| 6,359,833 B1 * | 3/2002 | English | 367/133 |
| 6,359,834 B1 * | 3/2002 | English | 367/133 |
| 6,482,017 B1 * | 11/2002 | Van Doorn | 439/89 |
| 7,184,670 B2 * | 2/2007 | Townsend | 398/169 |
| 7,362,657 B1 | 4/2008 | Donahoe et al. | |
| 7,688,680 B1 * | 3/2010 | Gunasekara et al. | 367/134 |
| 7,969,822 B2 * | 6/2011 | Basilico | 367/131 |
| 2002/0135838 A1 * | 9/2002 | Way | 359/127 |
| 2003/0117893 A1 * | 6/2003 | Bary | 367/16 |
| 2004/0262008 A1 * | 12/2004 | Deans et al. | 166/339 |
| 2005/0005181 A1 * | 1/2005 | Lee et al. | 713/400 |
| 2005/0249501 A1 * | 11/2005 | Wolcott et al. | 398/118 |
| 2006/0165417 A1 * | 7/2006 | Hsieh | 398/138 |
| 2006/0245757 A1 * | 11/2006 | Elahmadi et al. | 398/135 |
| 2006/0256652 A1 * | 11/2006 | Thomas | 367/15 |
| 2007/0183782 A1 * | 8/2007 | Farr et al. | 398/104 |
| 2008/0013163 A1 * | 1/2008 | Leonardo et al. | 359/341.31 |
| 2008/0144442 A1 * | 6/2008 | Combee et al. | 367/131 |

FOREIGN PATENT DOCUMENTS

WO    2008020152 A1    2/2008

OTHER PUBLICATIONS

Smart "Underwater Optical Communication Systems Part 1: Variability of Water Optical Parameters", Military Communications Conference, 2005. MILCOM 2005. IEEE , vol. 2, 1140-1146.*
International Search Report, Application No. PCT/US2009/051800, dated Oct. 23, 2009.

* cited by examiner

*Primary Examiner* — Nathan M Curs
*Assistant Examiner* — Tanya Ngo
(74) *Attorney, Agent, or Firm* — Bracewell & Giuliani LLP

(57) ABSTRACT

A subsea monitoring system.

29 Claims, 13 Drawing Sheets

WIRELESS HIGH CAPACITY SUB-SEA COMMUNICATIONS SYSTEM

FIELD OF THE INVENTION

This disclosure relates to monitoring systems for subsea monitoring systems.

BRIEF DESCRIPTION OF THE DRAWINGS

FIG. 4b is a schematic illustration of an exemplary embodiment of the communication network of the system of FIG. 4a.

FIG. 5 is a schematic illustration of an exemplary embodiment of the sensor nodes of the system of FIG. 4a.

FIG. 9 is a schematic illustration of an exemplary embodiment of the optical transceiver of the system of FIG. 4a.

FIG. 10 is a schematic illustration of an exemplary embodiment of the central controller of the system of FIG. 4a.

FIG. 12 is a schematic illustration of an exemplary embodiment of the optical transceiver of the system of FIG. 4a.

DETAILED DESCRIPTION

Figure 1:
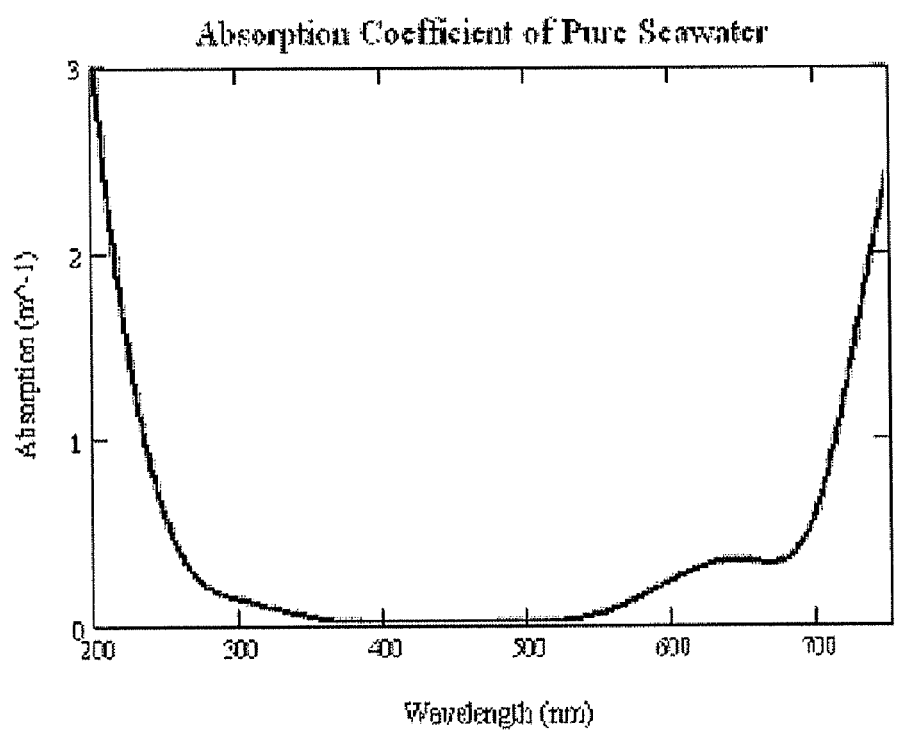
FIG. 1 is a graphical illustration of an exemplary embodiment of a suitable optical interval for subsea communications.

In the drawings and description that follows, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is to be considered an exemplification of the principles of the invention, and is not intended to limit the invention to that illustrated and described herein. It is to be fully recognized that the different teachings of the embodiments discussed below may be employed separately or in any suitable combination to produce desired results. The various characteristics mentioned above, as well as other features and characteristics described in more detail below, will be readily apparent to those skilled in the art upon reading the following detailed description of the embodiments, and by referring to the accompanying drawings.

Drilling for hydrocarbon deposits in deep water, production of hydrocarbon deposits in deep water, and maintenance of the subsea facilities related to the drilling for and the production of hydrocarbon deposits in deep water has become an important business and a strategic necessity. The art and science surrounding this activity is profound.

As an example, the vertical physical structures typically used in hydrocarbon exploration and production may extend for miles in length and typically these physical structures must be manipulated, interconnected, and monitored in seawater. Furthermore, in hydrocarbon exploration and production, there are also typically sensors and other plant equipment deployed on the seabed floor and it is desirable, and often essential, that the health or condition of these structures and equipment be appropriately monitored in order to quickly diagnose inchoate degradation or physical integrity problems. In addition, it is often undesirable to deploy sensors on the subsea structures that are linked to a surface unit by a cable that would typically need to be deployed as the subsea structure is built. In such instances, a small diameter cable would likely incur damage while a large diameter cable would consume much valuable area and its spool weight might be prohibitive. Thus, there is a need for a wireless solution to the problem of transporting acquired deepwater data to the surface for analysis and action during the subsea exploration for and the production of hydrocarbon deposits.

Among the difficulties to be overcome by the present exemplary embodiments are the optical transmission characteristics of the communication medium of seawater. In particular, the optical transmission characteristic of seawater is such that the intensity of a beam of light decreases exponentially with distance traveled. This decrease in intensity is due to two mechanisms: 1) absorption of light by the seawater; and 2) scattering of light by the seawater. As a result, the first fundamental consideration in the optical transmission of information in seawater is the optical transmitter frequency or wavelength. Furthermore, seawater has a window of relatively low absorption at very low frequencies and another window of relatively low absorption at the blue-green optical region, from about 400 nm to about 500 nm wavelength, as illustrated in FIG. 1.

Figure 2:
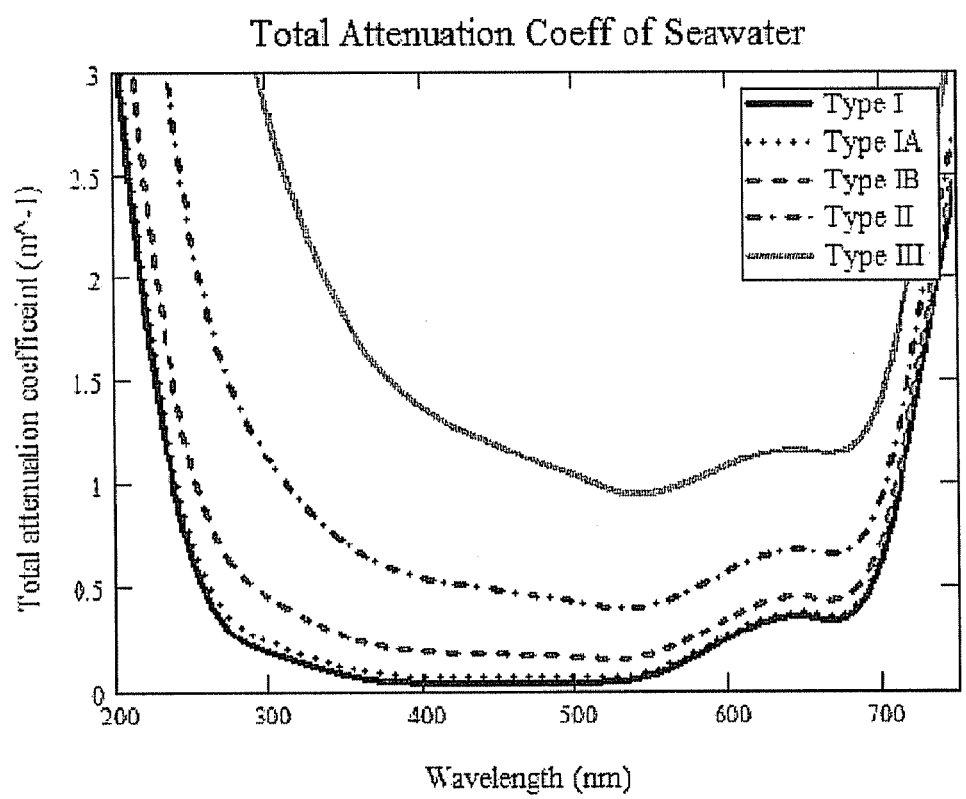
FIG. 2 is a graphical illustration of the total attenuation coefficient for seawater.

A second fundamental consideration for the propagation of optical signals in seawater concerns the seawater characteristics. In relatively clear seawater the rate of exponential decrease in the intensity of the beam of light is less than that in turbid water. The optical attenuation properties of different seawater types are usually classified by the commonly known Jerlov number. The Jerlov number for a particular operational environment is useful for setting the transmitter power relative to a Jerlov reference water type such as, for example, a Jerlov Type I which corresponds to markedly clear seawater. The total spectral attenuation coefficient for various Jerlov water types is illustrated in FIG. 2. Bioluminescence, sunlight, and biofouling near the surface can degrade the fidelity of an optical communication link. On the other hand, at significant depths, the seawater can be filled with marine snow, also known as organic detritus, that can also scatter the blue-green light. Over time, the marine snow may also accumulate on components near the seabed surface and completely block an optical source or optical detector. Bio-fouling due to marine growth is less severe when objects are well below the depth of penetration of sunlight.

Acoustic transmission in seawater also suffers some propagation impairments from turbidity but requires less energy per bit of data than optical communications and acoustic communication suffers from a much longer delay than an optical transmission.

Figure 3:
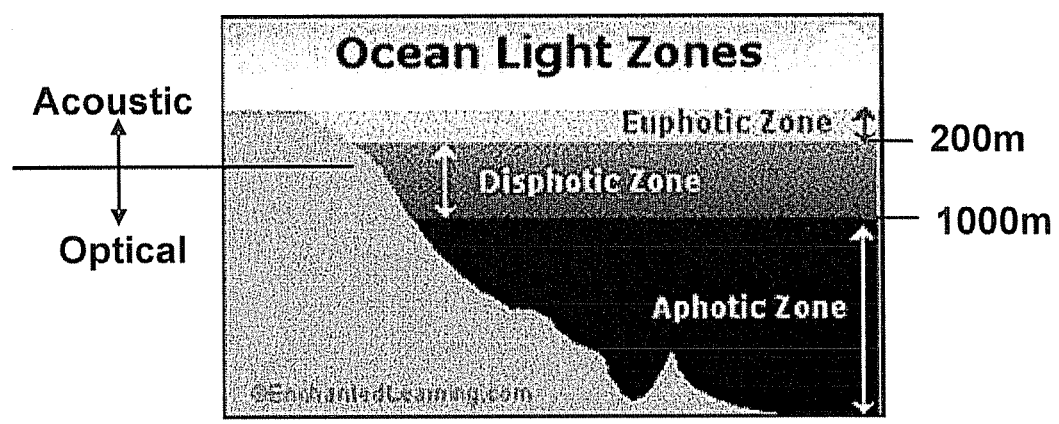
FIG. 3 is a graphical illustration of an exemplary embodiment of the communication pathways used in the subsea zones in a system for monitoring subsea devices.
Figure 4A:
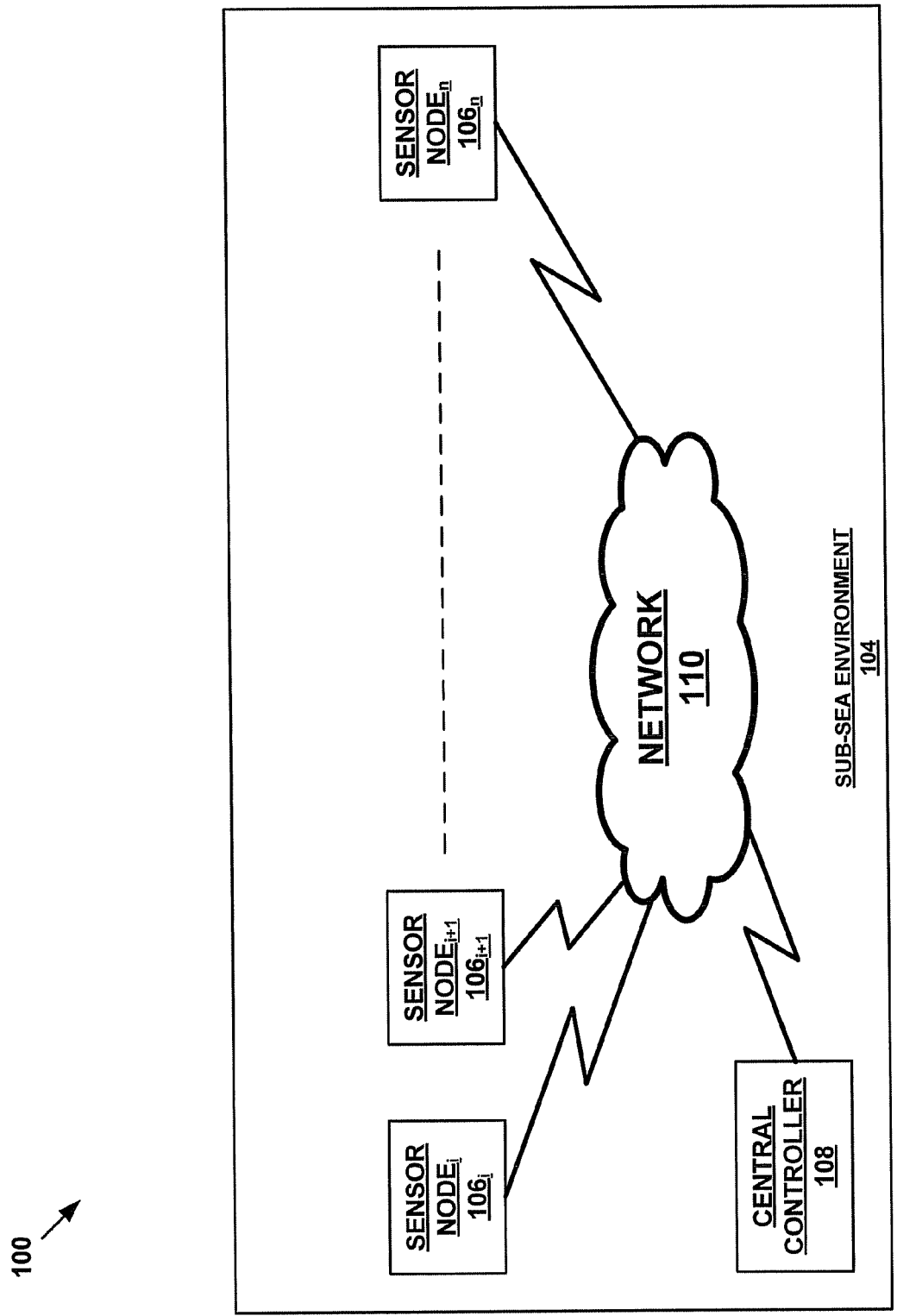
FIG. 4a is a schematic illustration of an exemplary embodiment of a system for monitoring subsea devices.
Figure 4B:
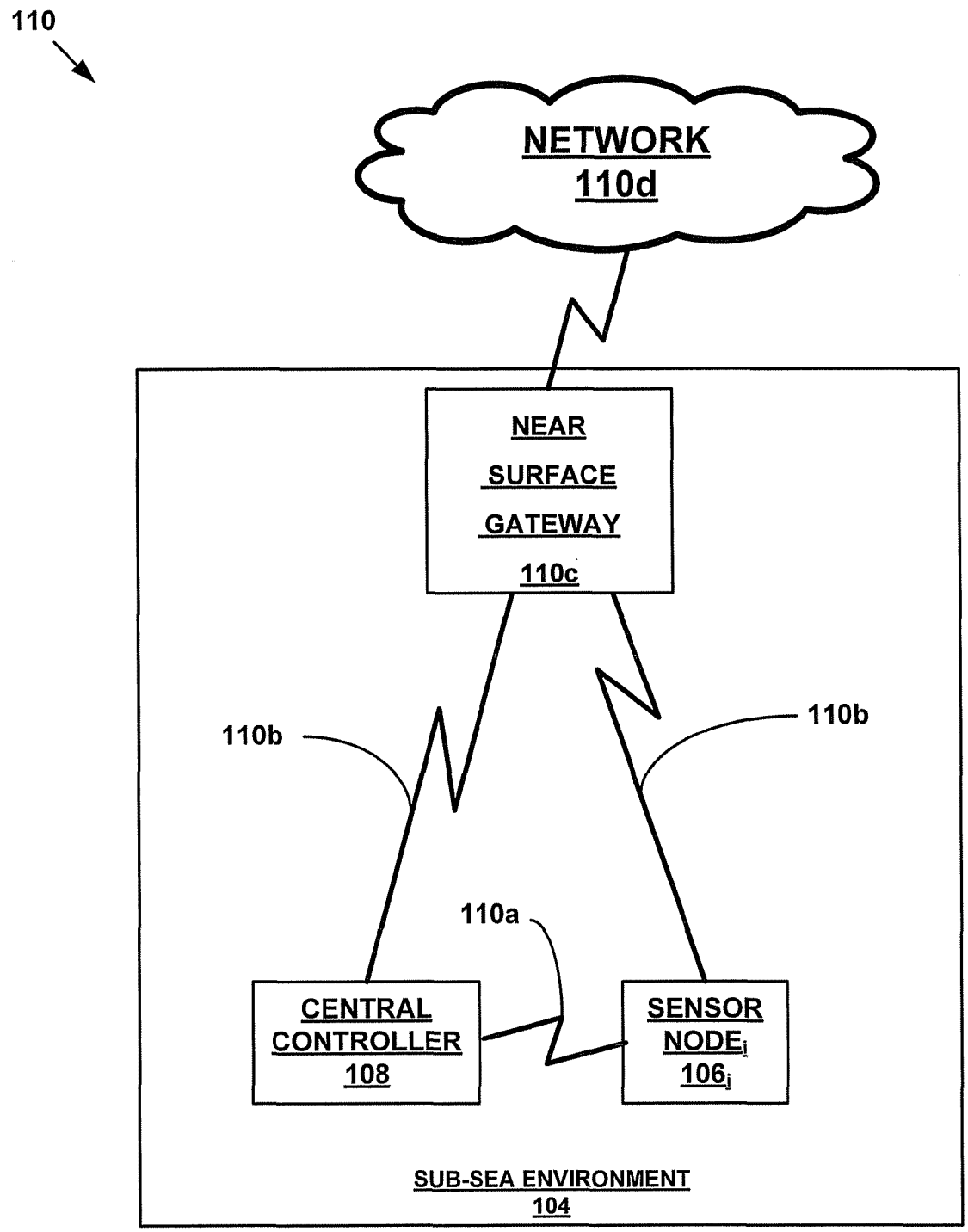
Figure 5:
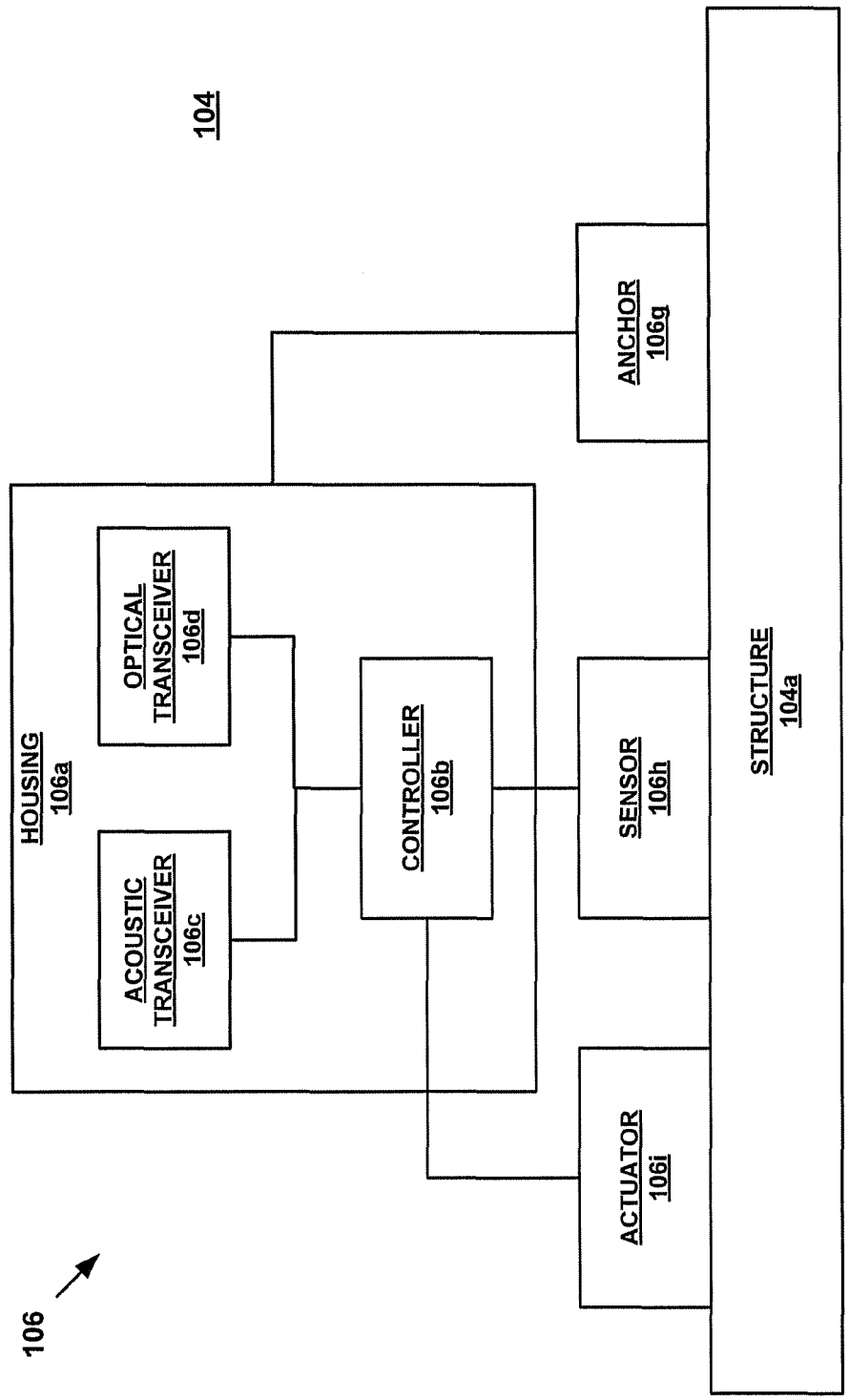
Figure 6:
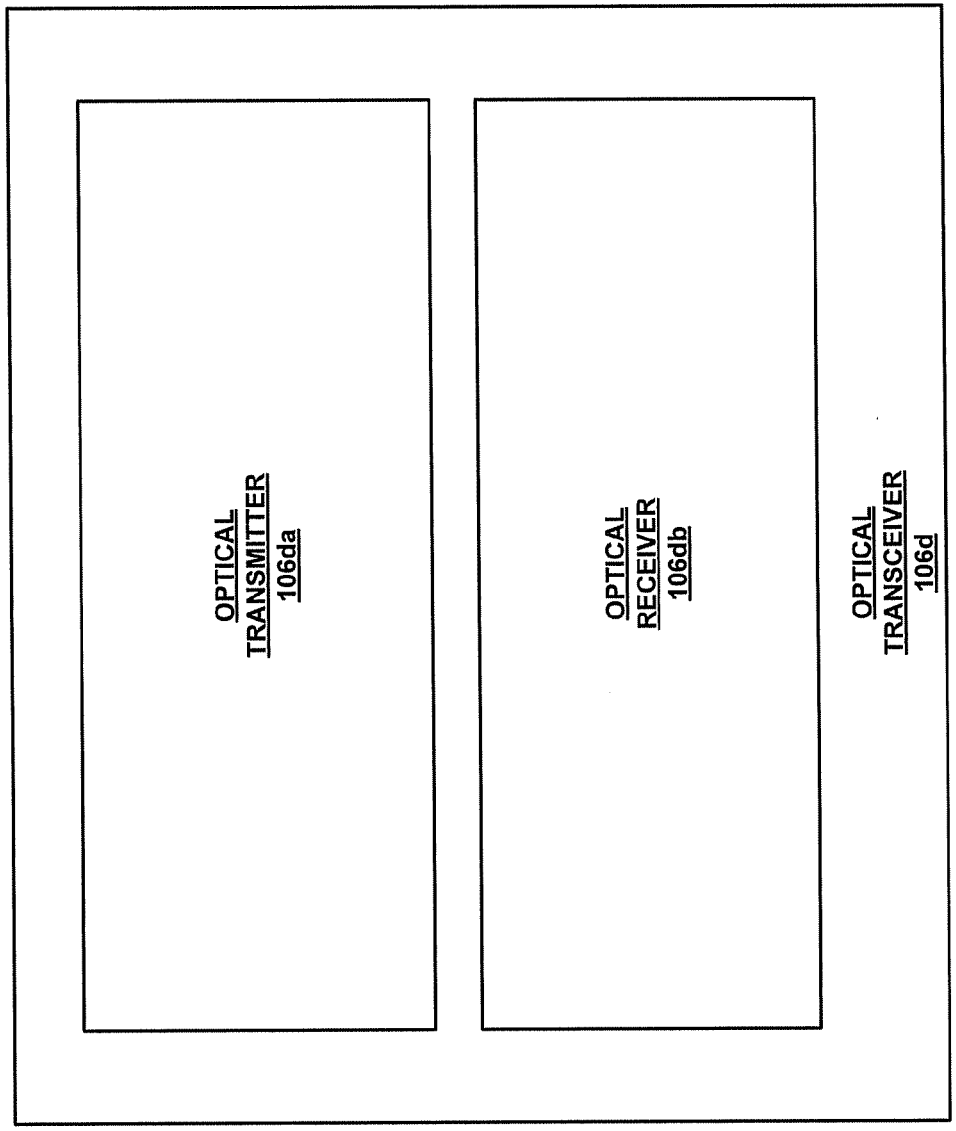
FIG. 6 is a schematic illustration of an exemplary embodiment of the optical transceiver of the sensor node of FIG. 5.
Figure 7:
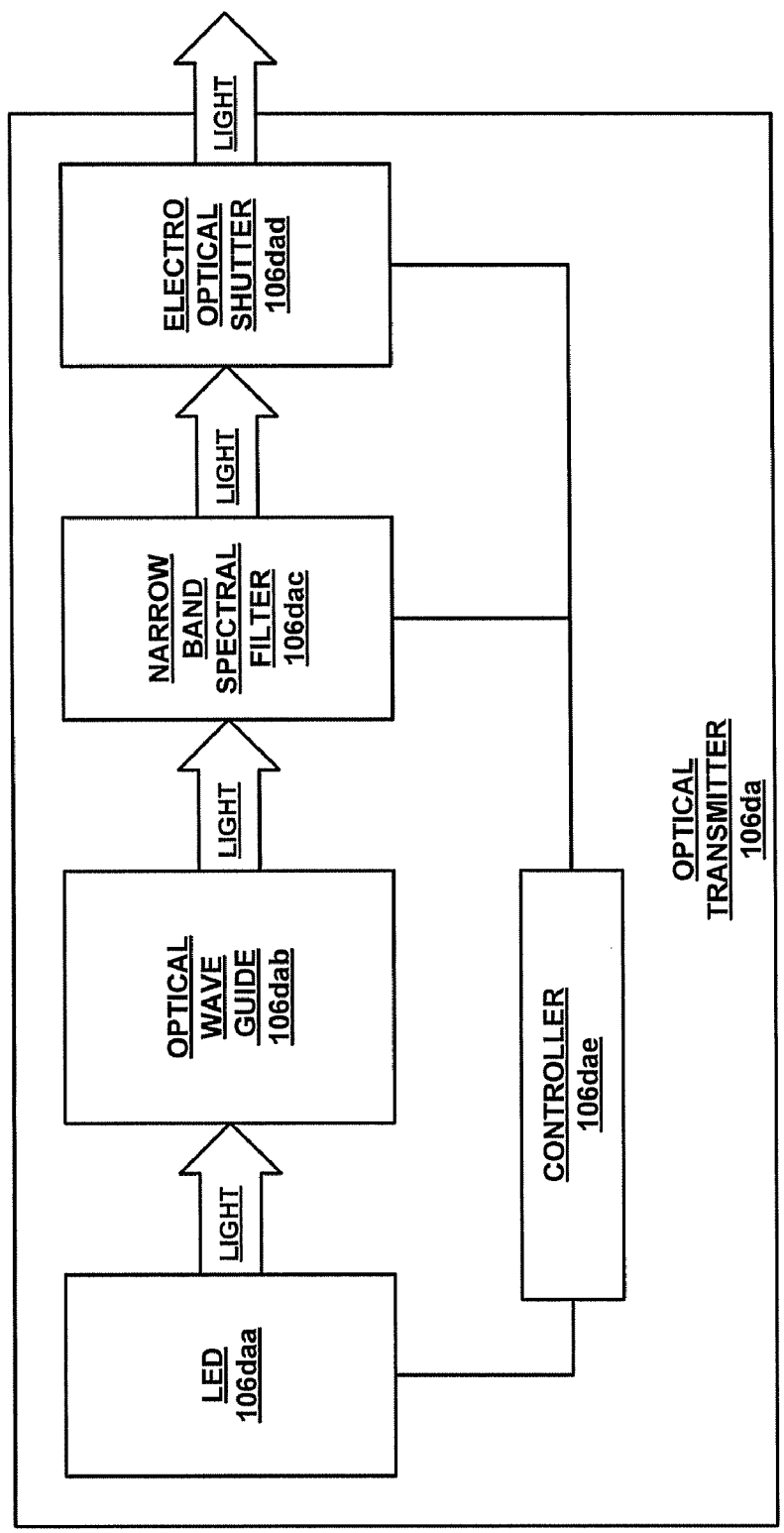
FIG. 7 is a schematic illustration of an exemplary embodiment of the optical transmitter of the optical transceiver of FIG. 6.
Figure 8:
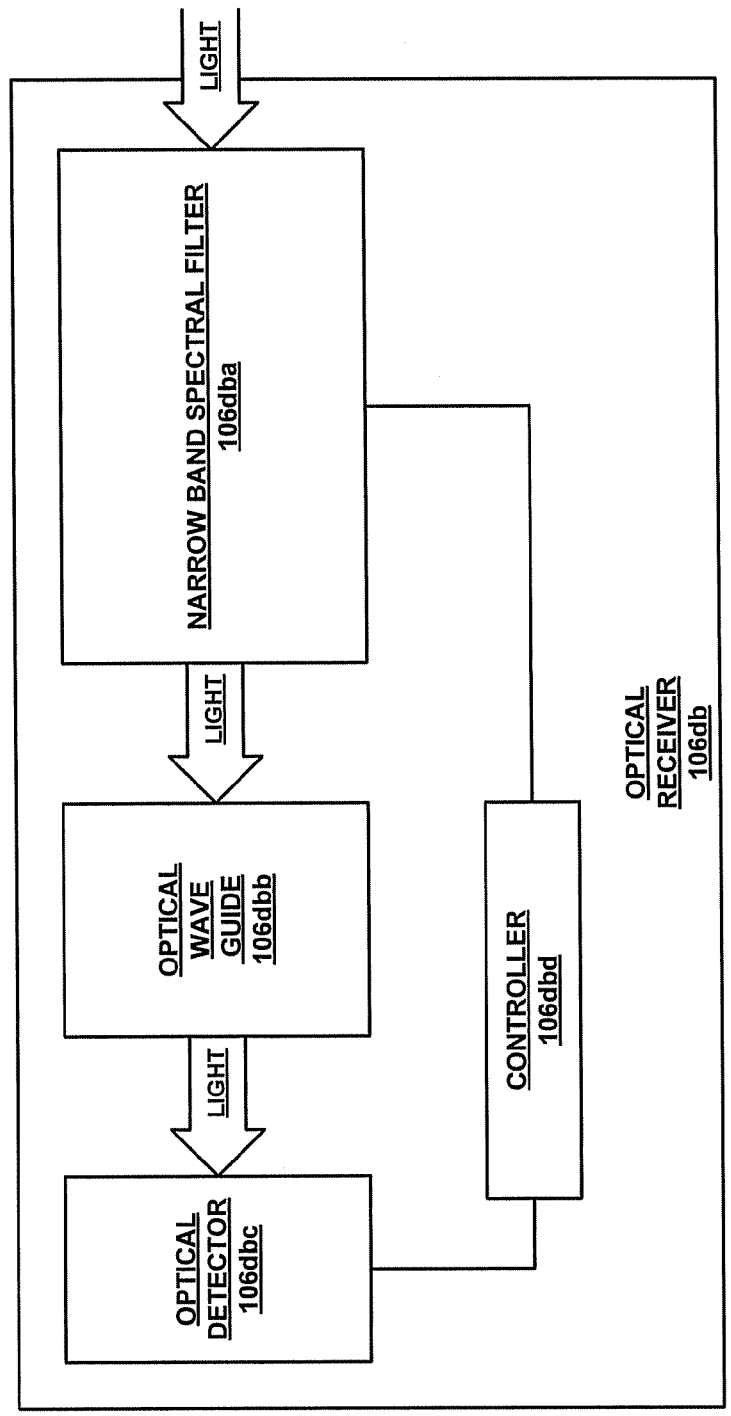
FIG. 8 is a schematic illustration of an exemplary embodiment of the optical receiver of the optical transceiver of FIG. 6.
Figure 9:
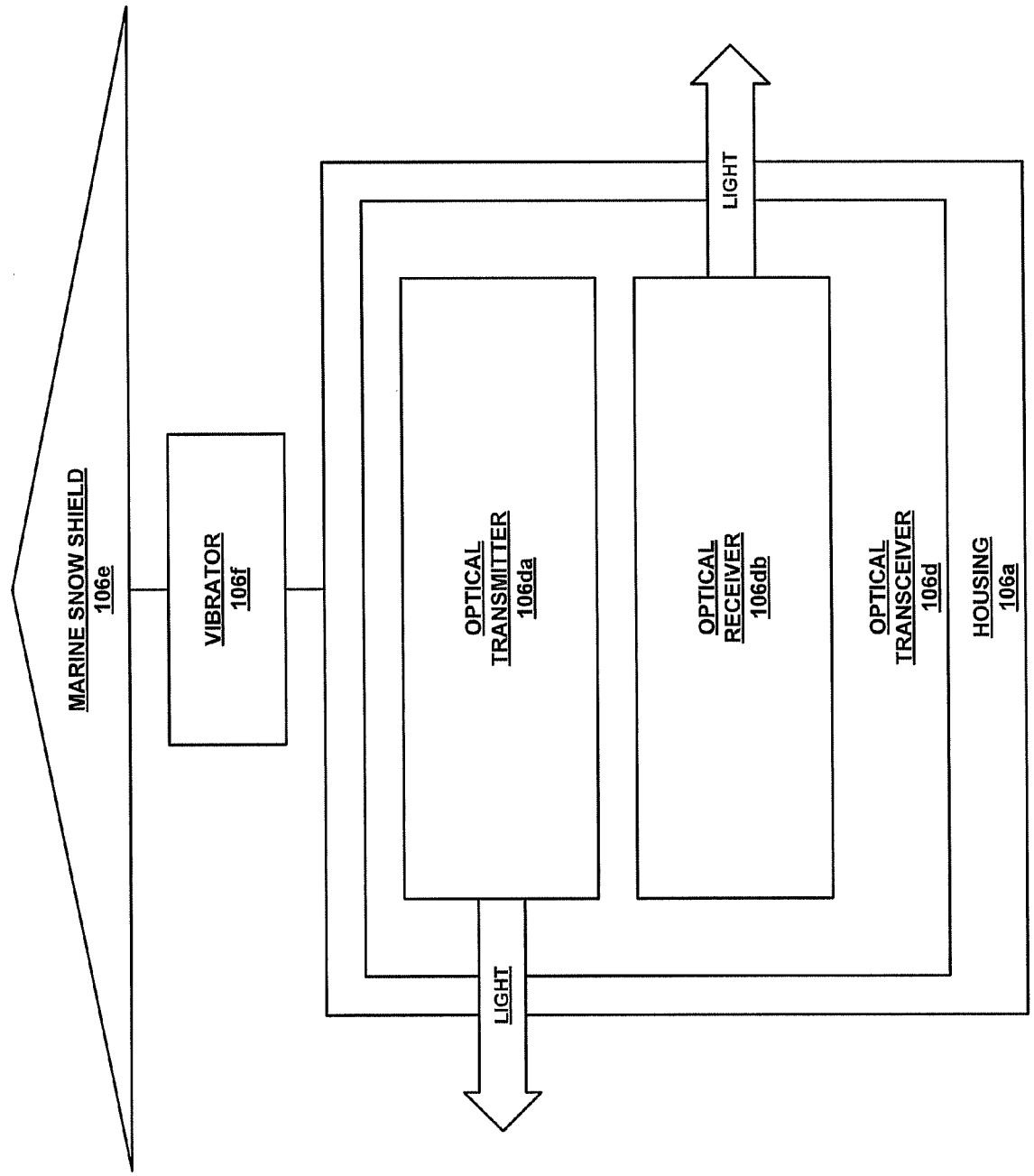
Figure 10:
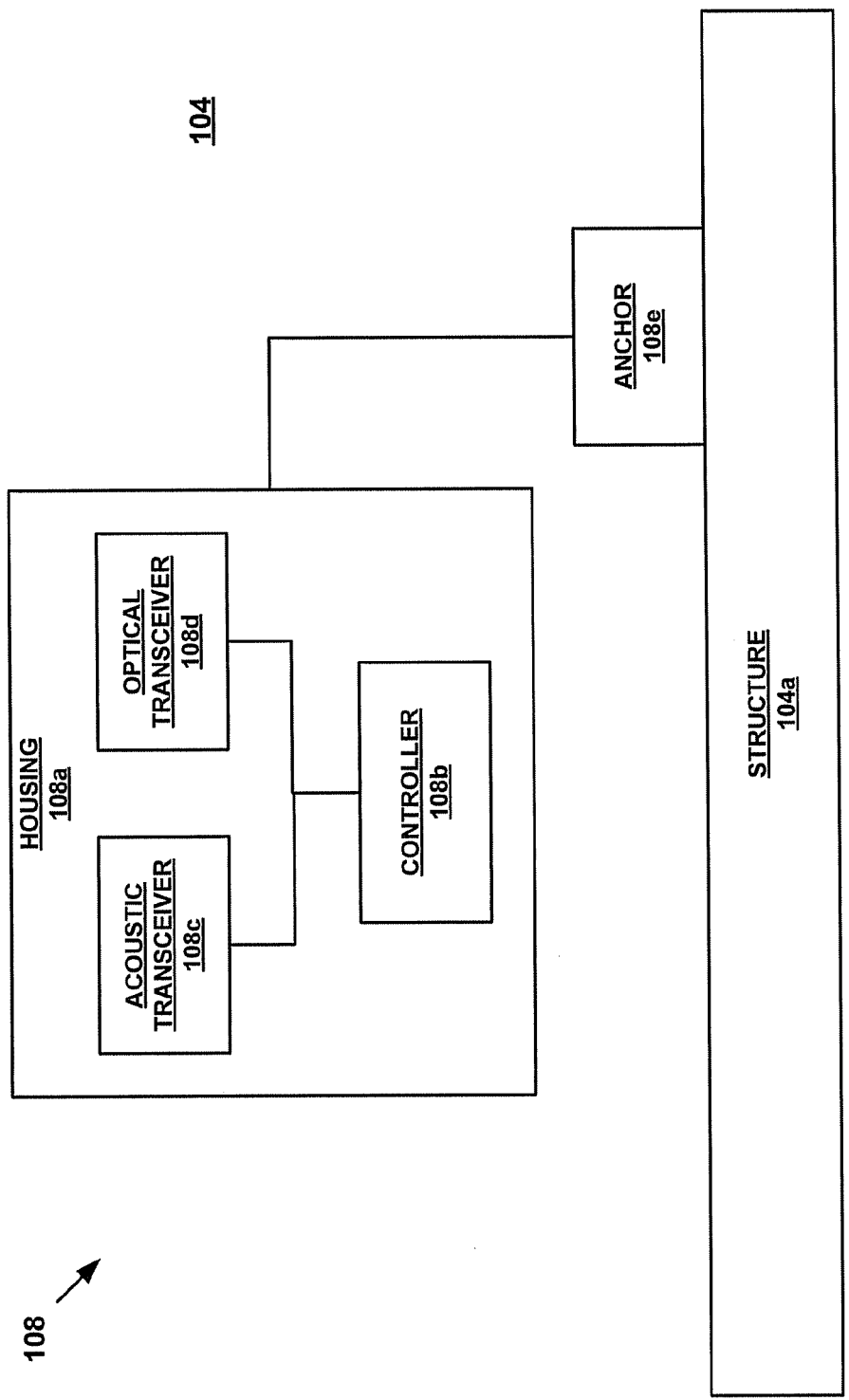

Thus, the limitations of optical and acoustic communication in seawater and the general solutions provided by the present exemplary embodiments may be summarized as illustrated in FIG. 3. In particular, within the euphotic and an upper portion of the disphotic subsea water zones, acoustic communication should provide the best mode of communications; however, within a lower portion of the disphotic and the aphotic subsea zones, optical communication should provide the best mode of communications. Note, however, that a combination of acoustic and optical communication may also be provided within each of the subsea water zones depending upon the specific operating conditions found therein. Typically, as illustrated in FIG. 3, the euphotic subsea water zone typically extends from the surface of the water down to a depth of about 200 meters, the disphotic subsea water zone typically extends between a depth of about 200 to 1000 meters, and the aphotic subsea water zone typically extends from a depth of about 1000 meters to the sea floor.

The present exemplary embodiments provide a hybrid communications technology comprising interoperable equipments in modes that are specifically useful for subsea exploration for and production of hydrocarbons. In particular, the present exemplary embodiments provide optical and acoustic transmission of information through seawater. In an exemplary embodiment, the communications of the present exemplary embodiments include optical and acoustic transceivers, data compression, and optical multiplexing that includes wavelength band division multiplexing that allows a plurality of optical signals to be simultaneously communicated in the subsea operating environment.

Referring now to FIGS. 4 to 10, an exemplary embodiment of a system 100 for monitoring and controlling devices in a subsea environment 104 includes one or more sensor nodes 106 that are operably coupled to one another and to at least one central controller 108 by a subsea communication network 110. In an exemplary embodiment, all of the sensor nodes 106 and the central controller 108 are positioned within the subsea environment 104. In an exemplary embodiment, the subsea communication network 110 includes at least one of an optical communication network and an acoustic communication network. In an exemplary embodiment, the subsea communication network 110 further includes at least one mesh network capable of providing optical and acoustic communication between and among the sensor nodes 106 and the central controllers 108. In an exemplary embodiment, the subsea communication network 110 further includes at least one mesh network that may utilize one or more conventional mesh network communication protocols.

In an exemplary embodiment, the subsea communication network 110 includes pathways 110a in the horizontal direction and pathways 110b in the vertical direction. In an exemplary embodiment, the pathways 110b in the vertical direction provide communication between one or more of the sensor nodes 106 and/or central controllers 108 and a communication pathway 110c positioned at or near the surface of the subsea environment 104. In an exemplary embodiment, the pathways 110b in the vertical direction are predominantly acoustic communication pathways while the pathways 110a in the horizontal direction are predominantly optical communication pathways.

In an exemplary embodiment, the communication pathway 110c is operably coupled to a network 110d that permits communication between the network 110 and other communication networks such as, for example, conventional satellite communication networks. In this manner, the operation of the system 100 may be remotely monitored and controlled.

In an exemplary embodiment, each of the sensor nodes 106 include a housing 106a that houses and supports a controller 106b that is operably coupled to an acoustic transceiver 106c and an optical transceiver 106d that are both also housed within and supported by the housing.

In an exemplary embodiment, the controller 106b is a conventional programmable controller such as, for example, a microprocessor and memory.

In an exemplary embodiment, the acoustic transceiver 106c is a conventional acoustic transceiver.

In an exemplary embodiment, the optical transceiver 106d includes an optical transmitter 106da and an optical receiver 106db.

In an exemplary embodiment, the optical transmitter 106da includes a light emitting diode ("LED") 106daa that transmits light that received by an end of an optical waveguide 106dab and then conveyed through the optical waveguide to a narrow band spectral filter 106dac. The light received at the narrow band spectral filter 106dac is then filtered to substantially eliminate all light having wavelengths outside of the passband of the narrow band spectral filter. As a result, only light having wavelengths substantially within the range of wavelengths within the passband of the narrow band spectral filter 106dac are permitted to pass therethrough. In an exemplary embodiment, the narrow band spectral filter 106dac includes a passband of about 20 nm. The light that is permitted to pass through the narrow band spectral filter 106dac then is received at an electro-optical shutter 106dad that controls the passage of all light therethrough into the subsea environment 104. In this manner, the electro-optical shutter 106dad provides an optical control valve that controls the passage of light out of the optical transmitter 106da into the subsea environment 104. In an exemplary embodiment, a controller 106dae is operably coupled to one or more of the LED 106daa, narrow band spectral filter 106dac, and electro-optical shutter 106dad. In an exemplary embodiment, the controller 106dae may also modulate the data signal before transmitting the data signal to the driver for the LED 106daa. In this manner, the optical data signals transmitted by the optical transmitter 106da may be encoded.

In an exemplary embodiment, the optical transmitter 106da may include a plurality of matching sets of optical waveguides 106dab, narrow band spectral filters 106dac, and electro-optical shutters 106dad that provide parallel optical pathways for transmitting optical data out of the optical transmitter. In an exemplary embodiment, the optical waveguides 106dab, narrow band spectral filters 106dac, and electro-optical shutters 106dad may then be used to divide up the available optical spectrum into N spectral ranges thereby permitting the optical communication channel to provide N simultaneous optical data channels. In this manner, the system 100 may provide wavelength band division multiplexing ("WBDM").

In an exemplary embodiment, the LED 106daa is a conventional LED such as, for example, a visible blue or green LED. In an exemplary embodiment, the optical waveguide 106dab is a conventional optical waveguide such as, for example, a optical fiber. In an exemplary embodiment, the narrow band spectral filter 106dac is a conventional narrow band spectral filter such as, for example, an interference filter. In an exemplary embodiment, the electro-optical shutter 106dad is a conventional electro-optical shutter such as, for example, a Kerr cell, a Mach-Zehnder interferometer and/or an electro-absorption modulator. In an exemplary embodiment, the controller 106dae is a conventional programmable controller such as, for example, a microprocessor and memory.

In an exemplary embodiment, the optical receiver 106db includes a narrow band spectral filter 106dba that receives incident light from the subsea environment 104. The light received at the narrow band spectral filter 106*dba* is then filtered to substantially eliminate all light having wavelengths outside of the passband of the narrow band spectral filter. As a result, only light having wavelengths substantially within the range of wavelengths within the passband of the narrow band spectral filter 106*dba* are permitted to pass therethrough. In an exemplary embodiment, the narrow band spectral filter 106*dba* has a passband of about 20 nm. The light that is permitted to pass through the narrow band spectral filter 106*dba* then is received at an end of an optical waveguide 106*dbb* and conveyed therethrough to an optical detector 106*dbc*. In an exemplary embodiment, a controller 106*dbd* is operably coupled to one or more of the narrow band spectral filter 106*dba* and optical detector 106*dbc*. In an exemplary embodiment, the controller 106*dbd* may also demodulate the data signal received by the optical detector 106*dbc*. In this manner, the optical data signals received by the optical receiver 106*db* may be decoded.

In an exemplary embodiment, the optical receiver 106*db* may include a plurality of matching sets of narrow band spectral filters 106*dba*, optical waveguides 106*dbb*, and optical detectors 106*dbc* that provide parallel optical pathways for receiving optical data into the optical receiver. In an exemplary embodiment, the narrow band spectral filters 106*dba*, optical waveguides 106*dbb*, and optical detectors 106*dbc* may then be used to divide up the available optical spectrum into N spectral ranges thereby permitting the optical communication channel to provide N simultaneous optical data channels. In this manner, the system 100 may provide WBDM.

In an exemplary embodiment, the narrow band spectral filter 106*dba* is a conventional narrow band spectral filter such as, for example, an interference filter. In an exemplary embodiment, the optical waveguide 106*dbb* is a conventional optical waveguide such as, for example, an optical fiber. In an exemplary embodiment, the optical detector 106*dbc* is a conventional optical detector such as, for example, an Si detector. In an exemplary embodiment, the controller 106*dbd* is a conventional programmable controller such as, for example, a microprocessor and memory.

In an exemplary embodiment, a marine snow shield 106*e* is coupled to a top portion of the housing 106*a* of the sensor node 106 for preventing marine snow from attenuating the transmission if light into or out of the optical transceiver 106*d*. In an exemplary embodiment, a vibrator 106*f* is further coupled between the housing 106*a* of the sensor node 106 and the marine snow shield 106*e* for controllably vibrating the marine snow shield to at least reduce the accumulation of marine snow on the top surface of the marine snow shield. In an exemplary embodiment, the marine snow shield 106*e* may, for example, be cone shaped structure. In an exemplary embodiment, the vibrator 106*f* may be a conventional vibrator device. In an exemplary embodiment, other devices may be used in addition to, or instead of, the vibrator 106*f* to at least reduce the accumulation of marine snow on the top surface of the marine snow shield 106*e* such as, for example, a rotating propeller and/or a water jet that may be operated continuously or intermittently.

Figure 12:
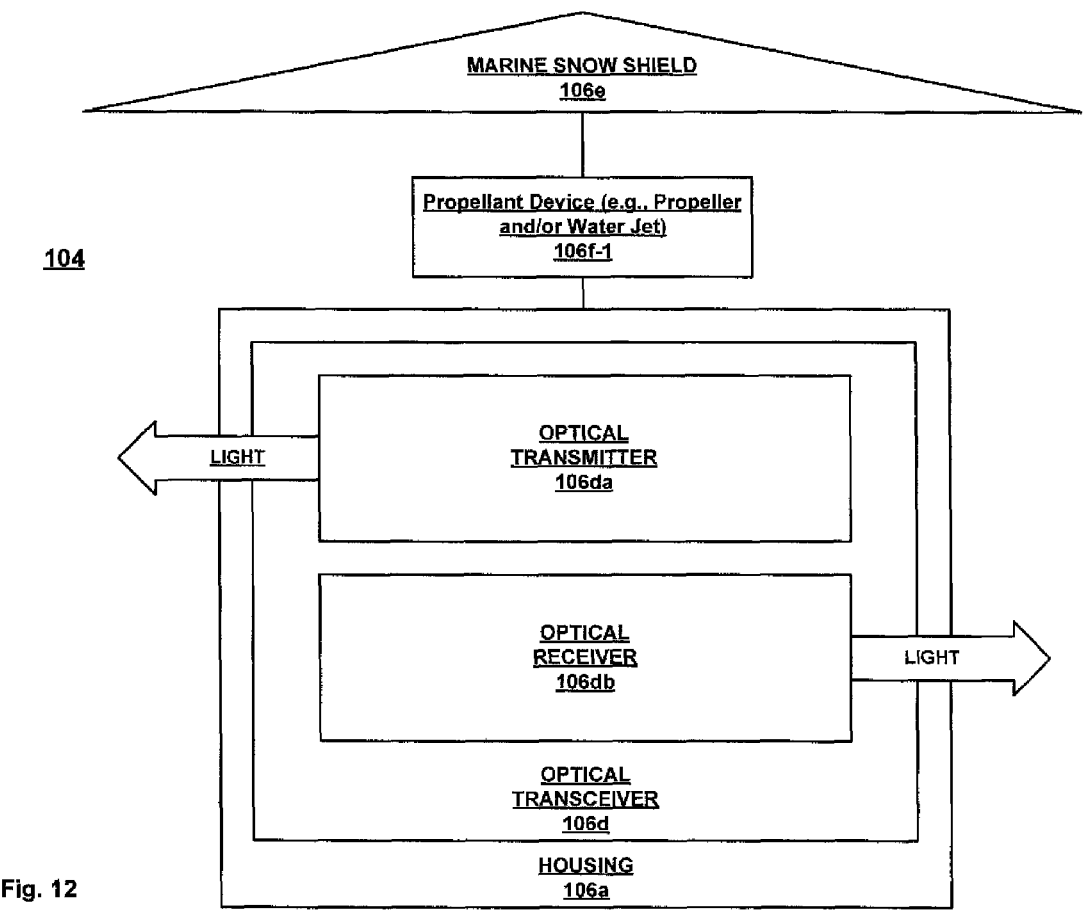

In an exemplary embodiment, a marine snow shield 106*e* is coupled to a top portion of the housing 106*a* of the sensor node 106 for preventing marine snow from attenuating the transmission if light into or out of the optical transceiver 106*d*. In an exemplary embodiment, a vibrator 106*f* is further coupled between the housing 106*a* of the sensor node 106 and the marine snow shield 106*e* for controllably vibrating the marine snow shield to at least reduce the accumulation of marine snow on the top surface of the marine snow shield. In an exemplary embodiment, the marine snow shield 106*e* may, for example, be cone shaped structure. In an exemplary embodiment, the vibrator 106*f* may be a conventional vibrator device. In an exemplary embodiment, other devices may be used in addition to, or instead of, the vibrator 106*f* to at least reduce the accumulation of marine snow on the top surface of the marine snow shield 106*e* such as, for example, a rotating propeller and/or a water jet device 106*f*-1 (FIG. 12) that may be operated continuously or intermittently.

In an exemplary embodiment, one or more sensors 106*h* and/or actuators 106*i* are operably coupled to the controller 106*b* of the sensor node 106. In this manner, the sensor node 106 may monitor one or more operating conditions of the structure 104*a* within subsea environment 104 and/or control one or more operational aspects of the structure within the subsea environment. In an exemplary embodiment, the sensors 106*h* and actuators 106*i* are conventional sensing and actuating devices and the structure 104*a* may, for example, include any aspect of a exploration and production system used to explore for and/or produce hydrocarbons within the subsea environment 104.

In an exemplary embodiment, the controller 106*b* may process data signals received from the sensor 106*h* by, for example, scaling the data signals, filtering the data signals, sampling the data signals, compressing the data signals, and/or encoding the data signals. In an exemplary embodiment, the controller 106*b* may also process data signals received from other sensor nodes 106 and/or the central controller 108.

In an exemplary embodiment, each sensor node 106 may include a plurality of one or more of the controllers 106*b*, the acoustic transceivers 106*c*, the optical transceivers 106*d*, the sensors 106*h*, and the actuators 106*i*. In an exemplary embodiment, one or more of the sensor nodes 106 may include a plurality of the optical transceivers 106*d*. In this manner, the sensor node 106 may transmit and receive optical data signals to and from a plurality of other sensor nodes and/or central controllers 108 in an optical mesh network.

In an exemplary embodiment, the operation of the optical transceivers 106*d* of the sensor nodes 106 may, for example, be: 1) continuous; 2) periodic with a duty cycle less than unity; 3) initiated by an exception event—e.g., the detection of a problem; or 4) initiated by an external control signal such as, for example, a unique frequency spectrum waveform such as an ultrasonic pulse, or other vibrational signal.

In an exemplary embodiment, each of the central controllers 108 include a housing 108*a* that houses and supports a controller 108*b* that is operably coupled to an acoustic transceiver 108*c* and an optical transceiver 108*d* that are both also housed within and supported by the housing.

In an exemplary embodiment, the controller 108*b* is a conventional programmable controller such as, for example, a microprocessor and memory.

In an exemplary embodiment, the acoustic transceiver 108*c* is a conventional acoustic transceiver.

In an exemplary embodiment, the optical transceiver 108*d* is substantially identical in design and operation to the optical transceiver 106*d*. In an exemplary embodiment, one or more of the central controllers 108 may include a plurality of the optical transceivers 108*d*. In this manner, the central controller 108 may transmit and receive optical data signals to and from a plurality of sensor nodes 106 and/or other central controllers in an optical mesh network.

In an exemplary embodiment, the central controller 108 may also include an anchor 108*e* for anchoring the housing 108*a* of the central controller to a structure 104*a* within the subsea environment 104. In an exemplary embodiment, the anchor 108*e* may be a conventional anchoring device. In this manner, the central controller 108 may be affixed to a known and stable location within the subsea environment 104.

In an exemplary embodiment, the near surface gateway 110c may include one or more acoustic and/or an optical transceivers that are substantially identical in design and operation to the acoustic and optical transceivers, 106c and 106d, respectively, of the sensor nodes 106.

In an exemplary embodiment, the near surface gateway 110c may include one or more optical transceivers that are substantially identical in design and operation to the optical transceivers 106d of the sensor nodes with the modification of a large optical aperture for receiving faint optical signals from optical transceivers positioned at great depths within the subsea environment 104.

In an exemplary embodiment, the transmission of optical data signals within the system 100 using the optical transceivers 106d and 108d may be made more robust through the use of error correction techniques such as, for example, forward error correction coding and multi-band redundant transmission with redundant transmissions staggered in time with respect to each other to counteract possible outage correlations in the optical communication channel.

Figure 11:
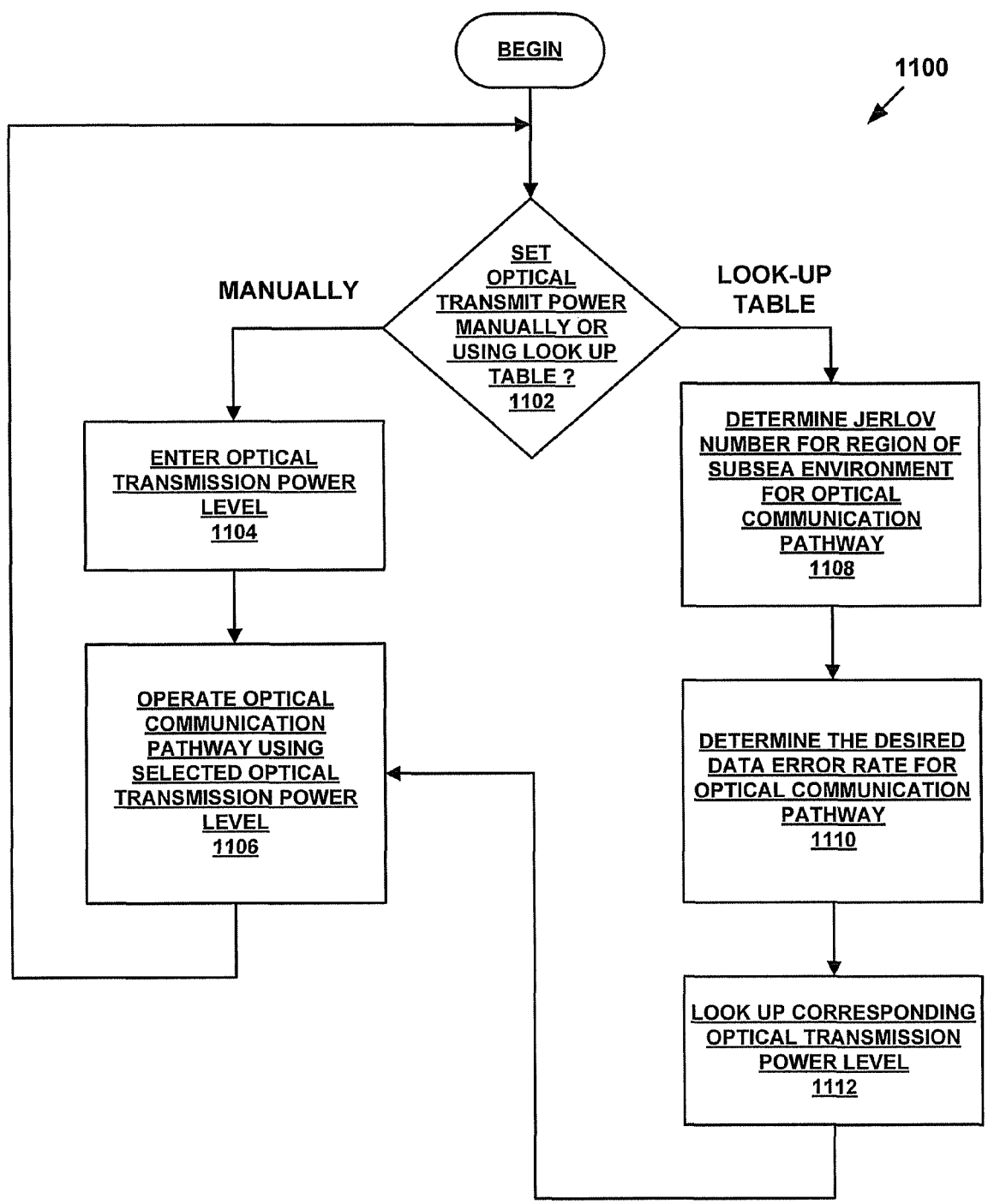
FIG. 11 is a flow chart illustration of a method of operating a system for monitoring subsea devices.

Referring now to FIG. 11, in an exemplary embodiment, one or more of the optical transceivers 106d and/or 108d of the system 100 implement a method 1100 of operating in which, in 1102, the system determines if the power level of the optical transmission of data from the transceiver will be set manually by an operator of the system or determined using a look up table.

If the power level of the optical transmission of data from the transceiver will be set manually by an operator of the system, then in 1104, the system 100 permits the operator of the system to enter the desired optical transmission power level and then the corresponding optical transceiver is then operated using the optical power transmission level in 1106.

Alternatively, if the power level of the optical transmission of data from the transceiver will be determined using a look up table, then the system determines the Jerlov number corresponding to the subsea environment 104 in which the optical communication pathway incorporating the optical transceiver will be operating in 1108. The system 100 will then determine the data error rate for the optical communication pathway incorporating the optical transceiver will be operating in 1110. The system 100 will then look up the corresponding optical power transmission level in a look up table stored in memory in 1112 that will permit satisfactory operation in the subsea environment 104 for the given Jerlov number and the acceptable data error rate corresponding to the communication pathway incorporating the optical transceiver. The corresponding optical transceiver is then operated using the optical power transmission level from the look up table in 1106.

In an exemplary embodiment, the method 1100 may be implemented by the corresponding optical transceiver 106d and/or 108d, the controllers 106b and/or 108b, and/or by a remote controller operably coupled to the network 110 through the network 110d.

In an exemplary embodiment, during the operation of the system 100, the optical communication pathways of the network 110 are operated using WBDM by dividing the available bandwidth of the optical communication pathways into N different spectral ranges to thereby accommodate N different simultaneous optical data streams within the optical communication pathways.

In an exemplary embodiment, WBDM is provided in the optical communication pathways of the network 110 of the system 100 using N optical waveguides, 106dab and 106dbb, in each of the optical transceivers 106d such that each optical waveguide captures approximately an equal amount of the optical power transmitted therethrough. Each of the N optical waveguides, 106dab and 106dbb, are then operably coupled to corresponding narrow spectral band filters, 106dac and 106dba, respectively, thereby providing N narrow spectral band filters, 106dac and 106dba, in the optical transceivers 106d.

It is understood that variations may be made in the above without departing from the scope of the invention. While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

The invention claimed is:

1. A system for monitoring one or more operating conditions in a subsea environment, comprising:
    a plurality of sensor nodes each positioned in contact with corresponding portions of one or more structures or equipment located within the subsea environment, each sensor node comprising:
        an acoustic transceiver for transmitting operating condition data and receiving acoustic signals within the subsea environment;
        an optical transceiver for transmitting operating condition data and receiving optical signals containing operating condition data transmitted from one or more of the other of the plurality of sensor nodes within the subsea environment;
        a sensor for sensing operating conditions of a portion of the portion of the structure or the equipment associated with the respective sensor node; and
        a controller operably coupled to the acoustic transceiver, the optical transceiver, and the sensor;
    an optical communication network established between at least two of the plurality of sensor nodes;
    an acoustic communication network established between a near surface gateway and at least one central controller in communication with the plurality of sensor nodes; and
    the at least one central controller fixedly positioned within the subsea environment and operably coupled to each of the plurality of sensor nodes via the optical communication network, each central controller comprising:
        an acoustic transceiver for transmitting signals to the near surface gateway and receiving acoustic signals from each of the plurality of sensor nodes within the subsea environment, the transmitted acoustic signals carrying operating condition data for the portion of the structure or equipment associated with each of the plurality of sensor nodes;
        an optical transceiver for transmitting to and receiving optical signals from: each of the plurality of sensor nodes within the subsea environment, the received optical signals carrying operating condition data of the portion of the structure or the equipment associated with the respective sensor node; and
        a controller operably coupled to the acoustic transceiver and the optical transceiver.

2. The system of claim 1, wherein the optical communication network comprises a mesh network.

3. The system of claim 1, wherein the communication network comprises:
    wherein the acoustics communication network comprises one or more substantially vertical communication pathways; and
    wherein the optical communication network comprises one or more substantially horizontal communication pathways established to pass operating condition data.

4. The system of claim 1, wherein the acoustic communication network comprises:
    the near surface communication gateway positioned near a surface of the subsea environment operably coupled to one or more vertical communication pathways.

5. The system of claim 1, wherein one or more of the sensor nodes comprise:
    an actuator for actuating elements to control one or more aspects of the structure or equipment being monitored within the subsea environment operably coupled to the controller.

6. The system of claim 1, wherein one or more of the optical transceivers of one or more of the plurality of sensor nodes each comprise:
    one or more optical transmitters comprising:
        one or more light sources; and
        a plurality of sets of:
            optical wave guides operably coupled to each of the light sources;
            narrow band spectral filters operably coupled to each of the optical wave guides; and
            optical shutters operably coupled to each of the narrow band spectral filters; and
    one or more optical receivers comprising a plurality of sets of:
        narrow band spectral filters;
        optical wave guides operably coupled to each of the narrow band spectral filters; and
        optical detectors operably coupled to each of the optical wave guides.

7. The system of claim 6, wherein one or more of the optical transceivers comprise an error correction coding device.

8. The system of claim 6, wherein one or more of the optical transceivers comprise a multi-band transmitter.

9. The system of claim 6, wherein one or more of the optical shutters comprise a Kerr cell.

10. The system of claim 6, wherein one or more of the optical shutters comprise a Mach-Zehnder interferometer.

11. The system of claim 6, wherein one or more of the optical shutters comprise an electro-absorption modulator.

12. The system of claim 1, wherein one or more of the sensor nodes comprise a plurality of optical transceivers.

13. The system of claim 1, wherein one or more of the sensor nodes comprise:
    a housing for supporting the optical transceiver; and
    a marine snow shield coupled to the housing for shielding the optical transceiver from the marine snow.

14. A system for monitoring one or more operating conditions in a subsea environment, comprising
    one or more sensor nodes positioned within the subsea environment, each sensor node comprising:
        an acoustic transceiver for transmitting and receiving acoustic signals within the subsea environment,
        an optical transceiver for transmitting and receiving optical signals within the subsea environment,
        a sensor for sensing operating conditions within the subsea environment,
        a controller operably coupled to the acoustic transceiver, the optical transceiver, and the sensor,
        a housing for supporting the optical transceiver,
        a marine snow shield coupled to the housing for shielding the optical transceiver from the marine snow, and
        a vibrator coupled to the housing and the marine snow shield for vibrating the marine snow shield;
    a communication network established between the sensor nodes and at least one central controller;
    the at least one central controller positioned within the subsea environment and operably coupled to the sensor nodes via a communication network, each central controller comprising:
        an acoustic transceiver for transmitting and receiving acoustic signals within the subsea, environment,
        a controller operably coupled to the acoustic transceiver and the optical transceiver,
        an optical transceiver for transmitting and receiving optical signals within the subsea environment, and
        a controller operably coupled to the acoustic transceiver and the optical transceiver.

15. The system of claim 14, further comprising a propeller device for removing snow from the marine snow shield.

16. The system of claim 14, further comprising a water jet for removing snow from the marine snow shield.

17. The system of claim 1, wherein one or more of the central controllers comprise a plurality of optical transceivers.

18. A sensor node apparatus in contact with portions of a structure or equipment for monitoring one or more operating conditions of the structure or equipment located in a subsea environment, comprising:
    an acoustic transceiver for transmitting and receiving acoustic signals from a vertically spaced apart near surface gateway from within the subsea environment;
    an optical transceiver for transmitting to and receiving optical signals from at least one other sensor node apparatus within the subsea environment;
    a sensor for sensing operating conditions of the structure or equipment located within the subsea environment;
    a controller operably coupled to the acoustic transceiver, the optical transceiver, and the sensor; and
    an actuator for actuating elements to control one or more aspects of the structure being monitored within the subsea environment operably coupled to the controller.

19. A sensor node apparatus in contact with portions of a structure or equipment for monitoring one or more operating conditions of the structure or equipment located in a subsea environment, comprising:
    an acoustic transceiver for transmitting to and receiving acoustic signals from a vertically spaced apart near surface gateway from within the subsea environment;
    an optical transceiver for transmitting to and receiving optical signals from at least one other sensor node apparatus within the subsea environment, the optical transceiver comprising:
        one or more optical transmitters comprising:
            one or more light sources; and
            a plurality of sets of:
                optical wave guides operably coupled to each of the light sources;
                narrow band spectral filters operably coupled to each of the optical wave guides; and
                optical shutters operably coupled to each of the narrow band spectral filters; and
        one or more optical receivers comprising a plurality of sets of:
            narrow band spectral filters;

optical wave guides operably coupled to each of the narrow band spectral filters; and optical detectors operably coupled to each of the optical wave guides;

a sensor for sensing operating conditions of the structure or equipment located within the subsea environment; and a controller operably coupled to the acoustic transceiver, the optical transceiver, and the sensor.

20. The apparatus of claim 19, wherein the optical transceiver comprises an error correction coding device.

21. The apparatus of claim 19, wherein the optical transceiver comprises a multi-band transmitter.

22. The apparatus of claim 19, wherein one or more of the optical shutters comprise a Kerr cell.

23. The apparatus of claim 19, wherein one or more of the optical shutters comprise a Mach-Zehnder interferometer.

24. The apparatus of claim 19, wherein one or more of the optical shutters comprise an electro-absorption modulator.

25. The apparatus of claim 18, wherein the sensor node apparatus comprises a plurality of optical transceivers.

26. The apparatus of claim 18, wherein the sensor node apparatus comprises:

a housing for supporting the optical transceiver; and a marine snow shield coupled to the housing for shielding the optical transceiver from the marine snow.

27. A sensor node apparatus for monitoring, one or more operating conditions of a structure or equipment located in a subsea environment, comprising:

an acoustic transceiver for transmitting and receiving acoustic signals within a subsea environment;

an optical transceiver for transmitting and receiving optical signals within the subsea environment;

a sensor for sensing operating conditions within the subsea environment;

a controller operably coupled to the acoustic transceiver, the optical transceiver, and the sensor;

a housing for supporting the optical transceiver;

a marine snow shield coupled to the housing for shielding the optical transceiver from the marine snow; and a vibrator coupled to the housing and the marine snow shield for vibrating the marine snow shield.

28. The apparatus of claim 27, wherein the sensor node further comprises a propeller device for removing snow from the marine snow shield.

29. The apparatus of claim 27, wherein the sensor node further comprises a water jet for removing snow from the marine snow shield.

* * * * *